Nov. 12, 1929.  H. N. COX  1,735,108
OPTICAL ADJUSTING DEVICE
Filed Oct. 10, 1925
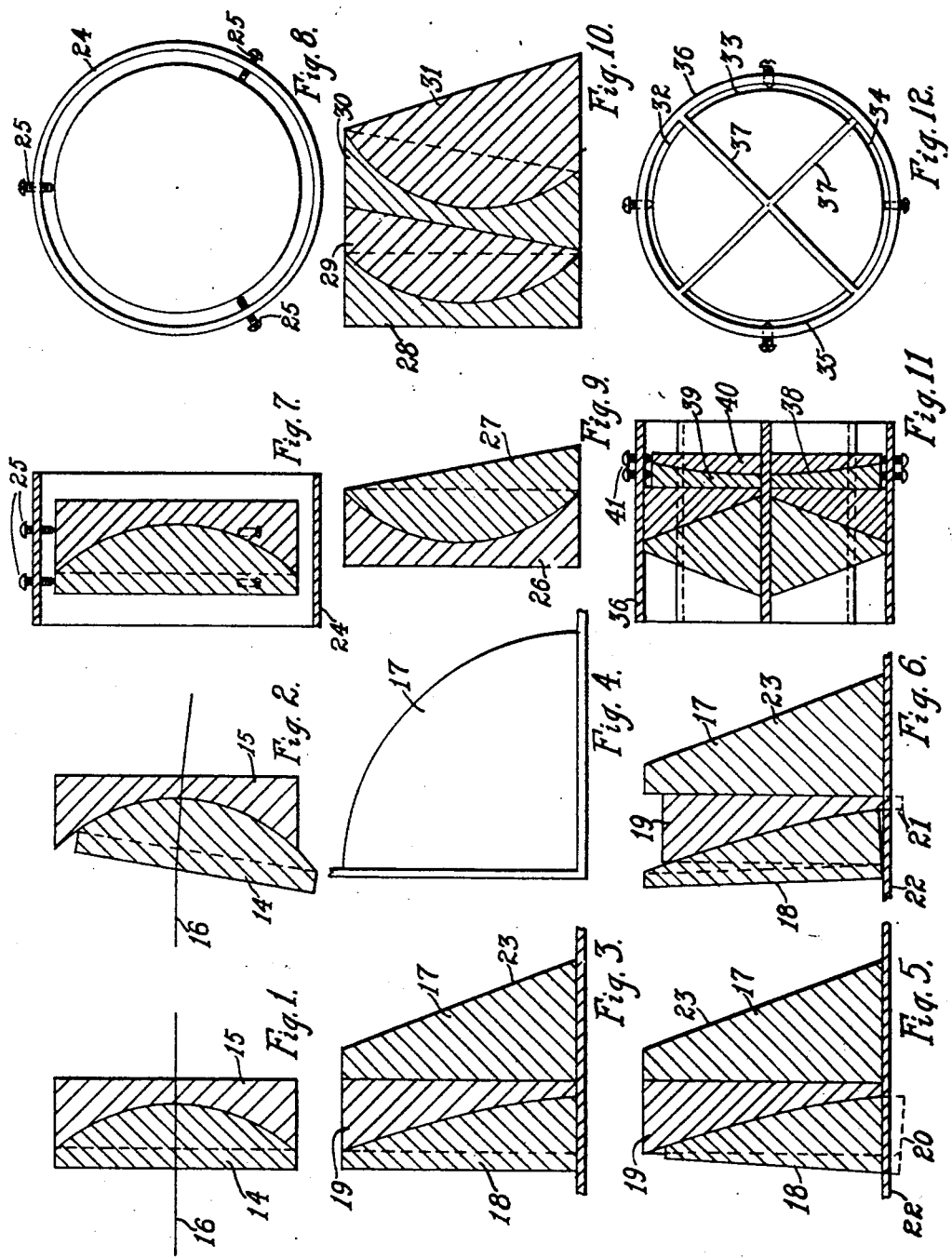
WITNESSES:
INVENTOR
Harold N. Cox
BY
ATTORNEY Patented Nov. 12, 1929

1,735,108

UNITED STATES PATENT OFFICE

HAROLD N. COX, OF GLEN RIDGE, NEW JERSEY, ASSIGNOR TO COX MULTI-COLOR PHOTO COMPANY, A CORPORATION OF DELAWARE

OPTICAL ADJUSTING DEVICE

Application filed October 10, 1925. Serial No. 61,697.

My invention relates to optical devices and particularly to optical adjusting devices.

One object of my invention is to provide a means for, and a method of, adjusting the deviation of light through prisms and lenses.

Another object of my invention is to provide a method of adjusting optical devices that precludes the necessity of polishing the ground surface of the optical device after adjustment.

Another object of my invention is to provide a method of determining the angles for grinding simple or achromatic prisms, without calculation and without determination of the refraction properties of the glasses.

Another object of my invention is to provide a device for making the final adjustment of prisms, the variation in angle of deviation of which from that specified is required to be within very narrow limits.

Another object of my invention is to provide an adjusting device, of the above indicated character, that may be of quadrant shape.

A further object of my invention is to provide an adjusting device, of the above indicated character, that shall be simple and inexpensive to construct and effective in its operation.

In practising my invention, I provide a plano-convex lens and a plano-concave lens composed of glasses of substantially the same refractive index and having substantially the same radius of curvature. The convex surface of one lens is disposed in engagement with or relatively near the concave surface of the other. When one of the lenses is turned with respect to the other, about the center of curvature a deviation is produced in the ray of light therethrough. When it is desired to adjust a prism, a pair of plano-convex and plano-concave lenses, as above described, are placed adjacent the prism and turned with respect to each other until the prism is adjusted to give the desired deviation.

In the accompanying drawing, Fig. 1 is a sectional view of an adjusting device embodying my invention in its initial position.

Fig. 2 is a sectional view of the device shown in Fig. 1 shown in its adjusted position.

Figs. 3 and 4 are, respectively, sectional and plan views of a quadrant of a circular prism with a quadrant of circular adjusting lens embodying my invention.

Figs. 5 and 6 are sectional views of the device shown in Figs. 3 and 4 in various adjusted positions.

Figs. 7 and 8 are sectional and plan views, respectively, of an adjustable holder for the adjusting lenses.

Fig. 9 is a sectional view of a simple prism constructed entirely of lenses.

Fig. 10 is a sectional view of an achromatic prism with the crown and flint portions both adjustable.

Figs. 11 and 12 are sectional and plan views, respectively, of an adjusting device for prisms used for the production of multiple images.

My adjusting device comprises a plano-convex lens 14, and a plano-concave lens 15, having the same index of refraction and of substantially the same radius of curvature. The convex and concave surfaces are either in engagement or relatively close together. A ray of light represented by the line 16 in Fig. 1, is not deviated, but when the lens 14 is turned angularly with respect to the lens 15, as shown in Fig. 2, the ray of light 16 is deviated.

If it is desired to adjust the deviation of a prism 17 of quadrant shape as shown in Figs. 3 and 4, the plano-convex and plano-concave lenses 18 and 19 which are similarly of quadrant shape are shifted or turned through an angle as shown in Figs. 5 and 6. When the deviation is adjusted in one direction, the lenses assume the position shown in Fig. 5, and when in the other direction, they assume the position shown in Fig. 6. If it is desired that the deviation be fixed after being adjusted, it is only necessary to grind off the portions 20 and 21. This will enable the lens to be fitted against a rigid support 22, which may also serve to support and fix the position of the prism 17. The glass parts may be held in position by means of screws, springs or other similar devices or they may be cemented in position. The glass parts may also be cemented together by means of a transparent cement such as balsam.

It will be observed that such an adjustment may be made much more quickly than by grinding the prism 17, because the surfaces that are ground do not transmit light and therefore it is not necessary to polish these surfaces after grinding. This would not be the case if the surface 23 were ground to adjust the prism 17 as it would have to be polished after each grinding. With my method, it is easier to control the deviation and fewer tests are required to determine the variation from the specified angle of deviation.

In Figs. 7 and 8, I have shown a holder 24 having three pairs of adjusting screws 25, for securing and positioning circular adjusting lenses 14 and 15 in the holder.

If it is desired to utilize my invention to construct a simple prism, a plano-concave lens 26 and a plano-convex lens 27, may be used and adjusted relatively as shown in Fig. 9, to produce the desired prismatic effect.

If it is desired to make the prism achromatic, as shown in Fig. 10, the flint members 28 and 29 are, respectively, plano-concave and plano-convex and the crown glass members 30 and 31 are, respectively, plano-concave and plano-convex. With this arrangement, the crown and flint glass members are both adjustable, thereby giving, in addition to adjustment of deviation, any degree of achromatism within the limits of the optical properties of the glasses used.

If the prism 17, shown in Figs. 3, 4, 5, and 6, is replaced by an achromatic prism and a change in deviation is made by adjusting the lenses 18 and 19, the light dispersing properties of the unit will also be changed but not appreciably if the change in deviation is small.

In my copending application Serial No. 472,145, filed May 24, 1921, I provide a prism composed of four parts and I have found it very difficult to adjust the four prisms to produce four exactly positioned images. My present invention is particularly adapted for adjusting such a multi-part prism and has been found to make it possible to produce multi-part prisms of sufficient accuracy and at such a reasonable price as to render the same commercial. It will be apparent that the adjusting device is important when it is understood that the prisms that are used for taking pictures, must be exactly similar to those used in projectng the pictures in my above mentioned application. With my present invention, these prisms may be easily adjusted with accuracy.

In Figs. 11 and 12 of the drawings, the four prisms 32, 33, 34 and 35, are secured in a holder 36 and are separated by separators 37. These prisms are achromatic. An adjusting unit 38, comprising four quadrant plano-concave lenses 39 and four quadrant plano-convex lenses 40, placed adjacent the prisms 32 to 35, inclusive, and separated from one another by the separators 37. The lenses are adjusted to produce the proper deviation in the prisms by grinding the edges such as those corresponding to the portions 20 and 21 shown in Figs. 5 and 6 or by introducing shims between the lenses and the separators 37. The screws 41 are then tightened to retain the lenses in position.

It will readily be seen that with my method, the device may be used for determining the angles for grinding simple and achromatic prisms without calculation or without determining the refractive properties of the glasses.

My invention, of course, is applicable to camera lenses as well as other prisms and lenses and is not limited to the shapes shown as the curved surfaces may be either cylindrical or spherical and the device may be variously modified without departing from the spirit and scope of the invention as set forth in the appended claims.

I claim as my invention:

1. The combination with a plurality of substantially equal symmetrically arranged prisms, of a similar number of similarly shaped plano-convex and a similar number of similarly shaped plano-concave lenses meeting one another in a common spherical surface, the companion lens parts being adjustable one relatively to the other in their common spherical surface, whereby the image transmitted through them and through the prisms may be relatively adjusted.

2. The combination with a prism of means, comprising co-operating lenses provided one with a concave and the other with a convex surface of corresponding curvature, concentrically arranged and movable one relatively to the other on the center of such curvature and in any plane, for adjusting the deviation of light through the prism.

In testimony whereof, I have hereunto subscribed my name this twenty-second day of September, 1925.

HAROLD N. COX.